United States Patent [19]

Wolf et al.

[11] 4,083,689

[45] Apr. 11, 1978

[54] SOLID ε-CAPROLACTAM DYESTUFF PREPARATIONS

[75] Inventors: Karlheinz Wolf; Konrad Nonn, both of Leverkusen; Reinhold Hörnle, Cologne; Hans Werner Petroll, Leverkusen, all of Germany

[73] Assignee: Bayer Aktiengesellschaft, Leverkusen, Germany

[21] Appl. No.: 617,195

[22] Filed: Sep. 26, 1975

[30] Foreign Application Priority Data

Sep. 26, 1974 Germany .............................. 2446040
Dec. 27, 1974 Germany .............................. 2461504

[51] Int. Cl.² .............................................. C09B 67/00
[52] U.S. Cl. ........................................ 8/85 B; 8/39 R; 8/41 R; 8/42 R; 8/79; 8/85 R; 8/DIG. 14
[58] Field of Search ............... 8/85 B, 85 R, DIG. 14, 8/85 A, 79

[56] References Cited

U.S. PATENT DOCUMENTS

| 2,290,945 | 7/1942 | Dahlen et al. | 8/62 |
|---|---|---|---|
| 2,928,712 | 3/1960 | Bradshaw | 8/85 |
| 3,096,142 | 7/1963 | Hartmark et al. | 8/85 |
| 3,519,377 | 7/1972 | Kitamura et al. | 8/62 |

FOREIGN PATENT DOCUMENTS

| 2,322,308 | 11/1973 | Germany. | |
| 528,844 | 11/1940 | United Kingdom. | |
| 654,795 | 6/1951 | United Kingdom. | |
| 823,062 | 11/1959 | United Kingdom | 8/85 |
| 1,060,063 | 2/1967 | United Kingdom. | |
| 1,178,356 | 1/1970 | United Kingdom. | |
| 770,460 | 3/1957 | United Kingdom | 8/125 |

OTHER PUBLICATIONS

Rattee and Breuer, "The Physical Chemistry of Dye Adsorption" (Academic Press), 1974, pp. 133–137.

*Primary Examiner*—A. Lionel Clingman
*Attorney, Agent, or Firm*—Plumley and Tyner

[57] ABSTRACT

Dyestuff preparations consisting of one or more water-soluble dyestuffs, one or more water-soluble carboxylic acid amides with melting points between 40° and 200° C optionally further customary auxiliaries are easily wettable with water and easily and rapidly soluble even in cold water.

12 Claims, No Drawings

SOLID ε-CAPROLACTAM DYESTUFF PREPARATIONS

The invention relates to dyestuff preparations of water-soluble dyestuffs, which easily disintegrate in water to give dyestuff solutions and which consist of one or more water-soluble dyestuffs, one or more water-soluble carboxylic acid amides with melting points between 40° and 200° C, preferably 60° to 100° C and, optionally, further customary auxiliaries, to their preparation and to their use for the preparation of dyestuff solutions.

In the case of many water-soluble dyestuffs, the wettability with water is so poor that the rate of solution is greatly reduced. Where dyestuff powders which tend to dust, and are therefore treated with anti-dusting agents (oils, phthalic acid esters and the like), are concerned, this treatment in most cases makes the wettability with water even poorer.

To compensate for the disadvantage of poor wettability it has already been proposed to market dyestuffs as a concentrated solution. However, these liquid preparations have other disadvantages, for example reduced stability if the temerature fluctuates, and crystallizing-out and sedimentation of the dyestuffs on storage.

Further, it has already been proposed to distribute dyestuffs in fused urea, in which case, after cooling, a solid preparation of good wettability is obtained (German Offenlegungsschriften (German Published Specifications) Nos. 2,322,308 and 1,619,375). In this case, however, sensitive dyestuffs may suffer decompositions as a result of the high temperature of the urea melt.

Using the dyestuff preparations according to the invention it now proves possible to avoid the abovementioned disadvantages.

Examples of water-soluble carboxylic acid amides employed are acetamide and its derivatives, such as chloroacetic acid amide, dichloroacetic acid amide and chloroacetic acid methylamide, α-piperidone and its derivatives such as 2-methyl-piperidone-6 or 2-propyl-piperidone-6, derivatives of pyrrolidone-2 such as 3,3-dimethylpyrrolidone-2, φ-oenantholactam and its derivatives and, with very particular advantage, ε-caprolactam and its derivatives, such as β-, γ- or ε-methyl-ε-caprolactam.

As water-soluble dyestuffs it is possible to employ cationic and anionic water-soluble dyestuffs which can also contain fibre-reactive groups, as well as water-soluble optical brighteners. Examples of water-soluble anionic and cationic dyestuffs which can be used are those described in German Offenlegungsschrift No. (German Published Specification) 2,317,175.

Examples of anionic dyestuffs are dyestuffs which carry sulphonic acid groups and carboxylic acid groups, and metal complex dyestuffs, such as 1:1 and 1:2 metal complexes which may belong to the most diverse chemical categories, for example to the phthalocyanine, nitro, diphenylmethane or triphenylmethane, oxazine, thiazine, dioxazine or xanthene series, but above all to the anthraquinone series and the azo series, especially the monoazo, disazo or polyazo series.

The azo dyestuffs can also contain metal bonded as a complex, as in the case of the 1:1 nickel, cobalt, copper or chromium complexes, above all the symmetrical or asymmetrical 1:2 cobalt or chromium complexes, of o-carboxy-o'-hydroxyazo dyestuffs or especially o,o'-dihydroxyazo dyestuffs of the benzene-azo-benzene, naphthalene-azo-naphthalene, benzene-azo-naphthalene, benzene-azo-pyrazole or benzene-azo-acetoacetic acid amide type.

Preferred dyestuffs are dyestuffs free from metal complexes and containing a sulphonic acid group, and symmetrical or asymmetrical 1:2 cobalt or chromium complexes, free from sulphonic acid groups and carboxylic acid groups, of o-carboxy-o'-hydroxyazo and o-hydroxy-o'-hyroxyazo dyestuffs, which may optionally contain substituted or unsubstituted sulphonamide, sulphone or acylamino groups.

The dyestuffs carrying sulphonic acid groups can for example be employed as sodium, potassium, lithium or ammonium salts.

The water-soluble cationic dyestuffs are dyestuffs which possess a coloured cation and a colourless anion. Examples of suitable cationic dyestuffs are those of the methine or azomethine series, as well as azo dyestuffs which contain an indolinium, pyrazolium, imidazolium, thiazolium, tetrazolium, oxdiazolium, thiodiazolium, oxazolium, diazolium, pyridinium, pyrimidinium or pyrazinium ring. The heterocyclic rings mentioned can optionally be substituted and be fused to aromatic rings. Furthermore, it is possible to use cationic dyestuffs of the diarylmethane, triarylmethane, oxazine and thiazine series, as well as azo and anthraquinone dyestuffs with external ammonium groups.

Suitable colourless anions are both organic and inorganic acid radicals, for example halides, hydroxylsulphate, disulphate, nitrate, phosphate, bicarbonate, carbonate, methosulphate, thiocyanate, trichlorozincate and tetrachlorozincate, acetate, chloroacetate, formate, propionate, benzoate or benzenesulphonate.

Customary auxiliaries used are, in particular, surface-active agents and derivatives of ammonia, of the formulae

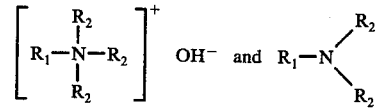

wherein $R_1$ represents the radical $-(CH_2-CH_2-O)_{1-6}H$ and $R_2$ represents hydrogen or $R_1$.

Surface-active agents which can be employed are anionic, cationic or non-ionic surface-active agents.

Non-ionic surface-active agents are above all understood as polyglycol ethers, such as alkyl polyglycol ethers or alkylphenol polyglycol ethers. Anionic surface-active agents are, for example, fatty acids, resin acids, sulphates, for example sulphated primary or secondary aliphatic alcohols with 10 to 18 carbon atoms, sulphated fatty acid amides, sulphated alkylene oxide adducts, sulphated partially esterified polyhydric alcohols and above all sulphonates such as long-chain alkylsulphonates, for example laurylsulphonate, cetylsulphonate, stearylsulphonate, mersolates, sodium dialkylsulphosuccinates, such as sodium dioctylsulphosuccinate, and taurides, for example oleyl methyl tauride (sodium salt), alkylarylsulphonates, such as alkylbenzylsulphonates having a straight-chain or branched alkyl chain with about 7 to 20 carbon atoms, and monoalkylnaphthalenesulphonates and dialkylnaphthalenesulphonates such as nonylbenzenesulphonate, dodecylbenzenesulphonate and hexadecylbenzenesulphonate, as well as 1-isopropylnaphthalene-2-sulphonate, di-isopropylnaphthalenesulphonate, di-n-butylnaphthalenesulphonate, diisobutylnaphthalenesulphonte, condensation products of naphthalenesulphonic acids and formaldehyde, such as dinaphthylmethanedisulphonate, and also ligninsulphonates and oxyligninsulphonates, sulphonates of polycarboxylic acid esters and polycarboxylic acid amides, and condensation products of fatty acids with aminoalkylsulphonates, as well as phosphated surface-active agents, such as monophosphoric acid esters and diphosphoric acid esters of oxethylated fatty alcohols, alkylphenols and fatty acids.

Examples of cationic surface-active agents are addition products of ethylene oxide and/or propylene oxide with alkylated or acylated amines, quaternary ammonium compounds, for example those whereof the N atom contains at least one lipophilic radical, for example an alkyl chain with 10 to 20 carbon atoms, or quaternary pyridinium compounds, such as pyridines whereof the N atom is quaternised by a higher alkyl radical or an alkoxymethylene radical, for example laurylpyridinium chloride or laurylpyridinium sulphate.

In the case of some dyestuffs, for example in the case of dyestuff-acids, it is advantageous to employ alkaline substances such as NaOH, KOH, $K_2CO_3$, $Na_2CO_3$ or amines, especially $Li_2CO_3$ LiOH, preferably in at least the stoichiometric amount.

The dyestuff preparations according to the invention can be prepared by either dispersing or, in a preferred embodiment, dissolving one or more water-soluble dyestuffs at a temperature above 50° C, preferably 80° to 100° C, in a melt of one or more water-soluble carboxylic acid amides with melting points of between 40° and 200° C, preferably 60° to 120° C, if appropriate in the presence of further customary auxiliaries, and cooling the melt whilst shaping it, or by dry-mixing the water-soluble dyestuffs with the water-soluble carboxylic acid amides which melt above 40° C, preferably above 60° C, and, optionally, further customary formulation ingredients, or drying an aqueous mixture or preferably an aqueous solution of these components.

The preparation according to the first-mentioned process can suitably be carried out by dispersing or, more advantageously, dissolving the dry dyestuffs, preferably in a melt of one of the carboxylic acid amides mentioned or of mixtures of the compounds mentioned, if appropriate in the presence of the further customary auxiliaries already mentioned, and subsequently cooling this melt, whilst shaping it, in accordance with known processes. Shaping can be effected, for example, by forcing the melt through a perforated plate and then cooling and cutting the ribbons, or cooling and grinding the melt, or converting the melt to flakes, or, particularly advantageously, by spraying the melt using a one-component or two-component nozzle or using a whirler disc and allowing it to solidify in a gas or in a liquid in which the granules are insoluble. This process gives non-dusting, free-flowing dyestuff preparations which differ advantageously from the dyestuff granules prepared, according to German Offenlegungsschrift (German Published Specification) No. 2,317,175, by pressing dyestuffs with dispersing agents and/or wetting agents and binders, in that they have high strength, are stable in shape and are abrasion-resistant, and have a very high solubility and wettability in water.

However, it is also possible to pour the melt into certain moulds, allow it to cool and comminute it if appropriate. Instead of dry dyestuff, moist dyestuffs, such as the dyestuff press cake, can also be used as starting materials. Suitably, in that case, the dyestuff press cake, optionally together with further auxiliaries, is added to the carboxylic acid amide and the water is distilled off, if appropriate under reduced pressure, until a melt is produced which solidifies on cooling and can be converted to shapes. However, it is also possible to prepare the dyestuffs in the carboxylic acid amides and convert this melt into shapes.

To produce the dyestuff preparations according to the second process, the water-soluble dyestuffs are either dry-mixed and ground, or first grond and then mixed, with the carboxylic acid amides and optionally further customary auxiliaries.

The grinding can be effected, for example, in a mixer, a ball mill, a pin-disc mill, a hammer mill or an air jet mill. Another possible method of preparation according to the second process is to dry an aqueous mixture or preferably an aqueous solution of the components and subsequently, if desired, grind the product to a powder. The drying can, for example, be effected in a circulating air cabinet, by means of paddle driers or roller driers, but preferably by spray-drying using a one-component or two-component nozzle or a whirler disc.

In the dyestuff preparations produced according to the second process, further adjuvants which can be added, in addition to the auxiliaries already mentioned, are inorganic salts, such as NaCl, $Na_2SO_4$, $(NH_4)_2SO_4$ and polyphosphates, but preferably non-electrolytes such as dextrin, sugars, polyvinylpyrrolidone, polyvinyl alcohol or urea. In addition, small amounts of anti-dusting agents such as oils or phthalic acid esters are frequently added.

The dyestuff granules according to the invention are distinguished by a high specific gravity and contain 1 to 90 percent by weight, preferably 20 to 80 percent by weight, of dyestuff, 1 to 90, preferably 5 to 70, percent by weight of a carboxylic acid amide or mixtures of the compounds mentioned, and 0 to 80 percent by weight of further customary auxiliaries.

The dyestuff preparations are easily wettable with water, very easily and rapidly soluble even in cold water, and particularly suitable for the production of aqueous dyestuff preparations which can be used for dyeing and printing a great diversity of materials.

Preparations in which the dyestuff has dissolved in the carboxylic acid amide melt are particularly advantageous. These are, for practical purposes, a solid solution of a dyestuff in a carboxylic acid amide, which as a result exhibits ideal fine distribution of the dyestuff.

EXAMPLE 1

75 g of acetamide are fused in a flask. 25 g of an orange dyestuff of the formula

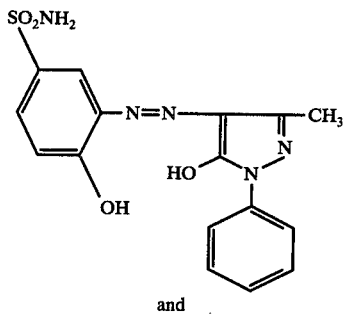

and

-continued

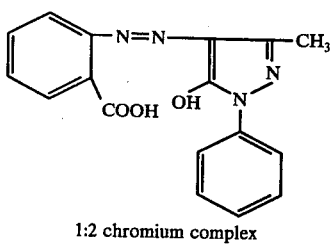

1:2 chromium complex are dissolved therein whilst stirring at a temperature of about 100° – 120° C. Shapes can be prepared from this melt as follows:

a. The melt is poured onto a metal sheet and is allowed to solidify through cooling, and the thin film is ground to give flakes of 1 – 5 mm size. However, it is also possible to cool the melt on a cooling roller provided with strippers, whereby flakes are obtained directly, or to force the melt — before it has solidified completely — through a sieve, to obtain longish-shaped granules.

b. The melt is sprayed in air, using a one-component nozzle. As a result of contact with the cold air, the particles solidify in spherical shapes. These granules dissolve easily in cold water and are free from dust and very free-flowing.

EXAMPLE 2 a. Shapes are produced as in Example 1, from a melt consisting of 75 g of caprolactam and 25 g of the dyestuff mentioned in Example 1.

b. A dyestuff preparation is also obtained if 104 g of the dyestuff mentioned in Example 1, 48 g of ε-caprolactam, 48 g of an anionic dispersing agent which has been prepared by condensation of naphthalene, formaldehyde and sulphuric acid and 500 ml of water are heated to 80° – 90° C and the hot solution is dried in a spray drier using a two-component nozzle (input air temperature 180° C, output air temperature 80° C).

A dyestuff preparation which has a solubility of 60 g/l in water at room temperature is obtained. (The solubility determined according to H. Capponi and R. Pfister: "Die Bestimmung der Loslichkeit von Farbstoffen" ("The Determination of the Solubility of Dyestuffs") in Textilveredelung 2 (1967), No. 1. page 13 – 16).

EXAMPLE 3

Shapes are produced as in Example 1, from a melt consisting of 79 g of acetamide and 21 g of a black dyestuff of the formula

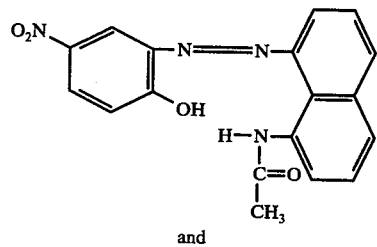

and

-continued

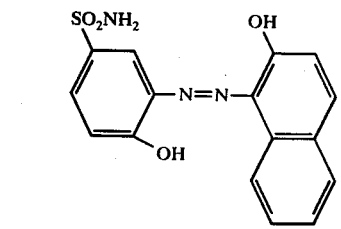

1:2 chromium complex

EXAMPLE 4

Analogous shapes to those in Example 3 are obtained if acetamide is replaced by caprolactam.

EXAMPLE 5

Shapes are produced as in Example 1, from melts of the following composition:

a. 75 g of acetamide and 25 g of a 1 : 2 cobalt complex dyestuff prepared by cobaltizing

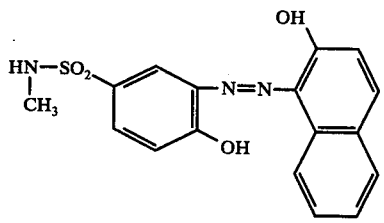

b. 56 g of caprolactam and 44 g of a red dyestuff prepared by quaternizing

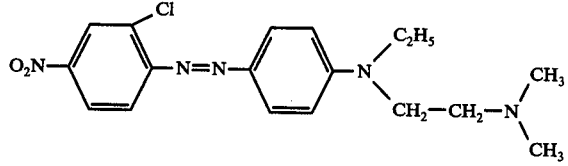

with dimethyl sulphate.

c. 151 g of caprolactam or acetamide and 49 g of a blue dyestuff of the formula

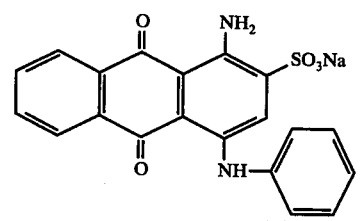

d. 78 g of acetamide or caprolactam and 22 g of a blue dyestuff of the formula

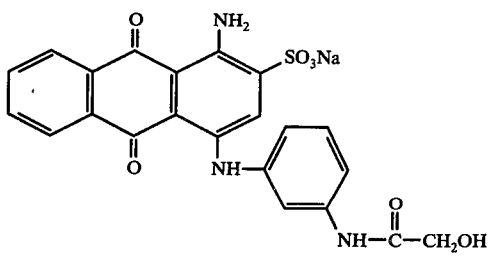

e. 82 g of acetamide and 18 g of a red dyestuff of the formula

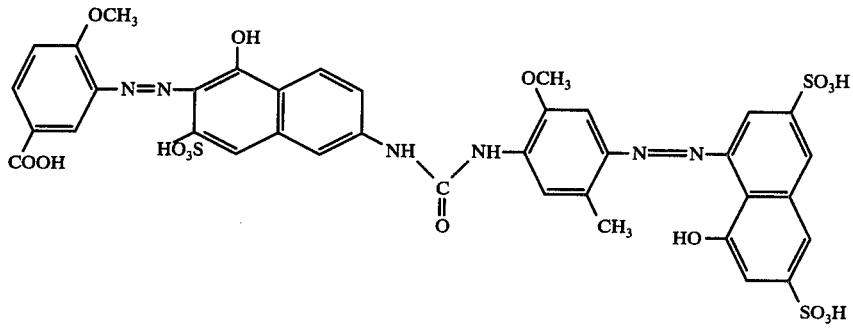

EXAMPLE 6

44 g of dyestuff of the following structure

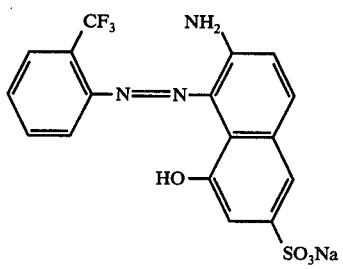

are mixed, and ground, with 106 g of ε-caprolactam in a mixer. A dyestuff mixture having a solubility in water of 60 g/l at room temperature (see Example 2 (b) is obtained.

EXAMPLE 7

34 g of the dyestuff of the following structure

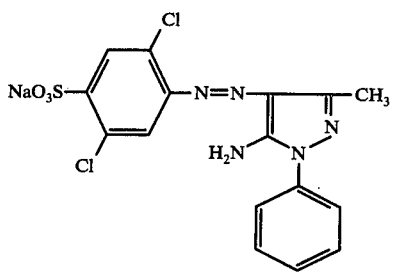

are mixed, and ground, with 66 g of ε-caprolactam. A dyestuff mixture having a solubility in water of 40 g/l at room temperature (see Example 2 b) is obtained.

EXAMPLE 8

114 g of 70% strength aqueous press cake (= 80 g of dry dyestuff) of the yellow 1 : 2 chromium complex dyestuff prepared by chroming the dyestuff of the formula

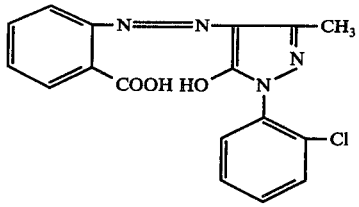

are stirred with 600 ml of water, 60 g of ε-caprolactam and 60 g of dextrin. The mixture is heated to about 90° C, whilst stirring, and the hot solution is dried in a spray drier using a two-component nozzle (input air temperature 180° C, output air temperature 80° C). A yellow powder, which has a solubility of 40 g/l in water at room temperature (see Example 2 (b) is obtained.

EXAMPLE 9

A red dyestuff, prepared according to customary processes by diazotization and coupling, and having the following structure

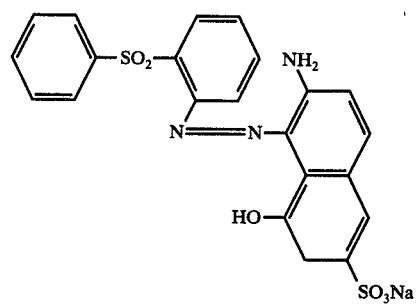

is acidified before being isolated, filtered off and dried.

43 g of the dried dyestuff are mixed, and ground, with 10 g of ε-caprolactam and 47 g of dextrin.

A dyestuff formulation having a solubility in cold water of 30 g/l (see Example 2 (b) is obtained.

We claim:

1. A solid dyestuff preparation in granular form consisting essentially of one or more water-soluble dyestuffs dispersed or dissolved in ε-caprolactam and formed by (a) dispersing or dissolving said dyestuff in an ε-caprolactam melt; (b) solidifying the resulting dyestuff/ε-caprolactam melt by cooling; and (c) shaping the melt during or after cooling into granules.

2. The dyestuff preparation of claim 1 wherein the dyestuff is dissolved in the ε-caprolactam melt, and the resultant dyestuff/ε-caprolactam melt is shaped during cooling.

3. The dyestuff preparation of claim 2, wherein the dyestuff/ε-caprolactam melt is sprayed and the spray solidified by rapid cooling thereof to provide free-flowing, non-dusting granules of said dyestuff preparation.

4. The dyestuff preparation of claim 3, wherein the dyestuff/ε-caprolactam melt is sprayed in a gas.

5. The dyestuff preparation of claim 3, wherein the dyestuff/ε-caprolactam melt is sprayed into a liquid in which the granules are insoluble.

6. The dyestuff preparation of claim 3, wherein the dyestuff/ε-caprolactam melt is cooled on a cooling roller and flaked.

7. The dyestuff preparation of claim 3, wherein the dyestuff/ε-caprolactam melt is forced through a sieve while partially solidified to obtain longish-shaped granules.

8. Method of preparing dyebaths and printing pastes by employing the dyestuff preparations of claim 1.

9. The solid dyestuff preparation of claim 2 wherein said preparation comprises from 20 to 80% by weight of dyestuff and from 5 to 70% by weight of ε-caprolactam.

10. Dyestuff preparations according to claim 1, characterized in that they contain an anionic or cationic dyestuff.

11. A solid dyestuff preparation in granular form consisting essentially of one or more water-soluble dyestuffs in ε-caprolactam formed by spray-drying an aqueous solution of ε-caprolactam and the water-soluble dyestuff.

12. A process for the production of non-dusting, free-flowing water-wettable compositions of heat-sensitive water-soluble dyestuffs consisting essentially of:
 a. dissolving one or more heat-sensitive, water-soluble dyestuffs in a melt of ε-caprolactam;
 b. forming solid granules of the dyestuff/ε-caprolactam melt by spraying this melt in a gas or liquid in which the granules are insoluble and rapidly cooling the spray.

* * * * *